Figure 1:
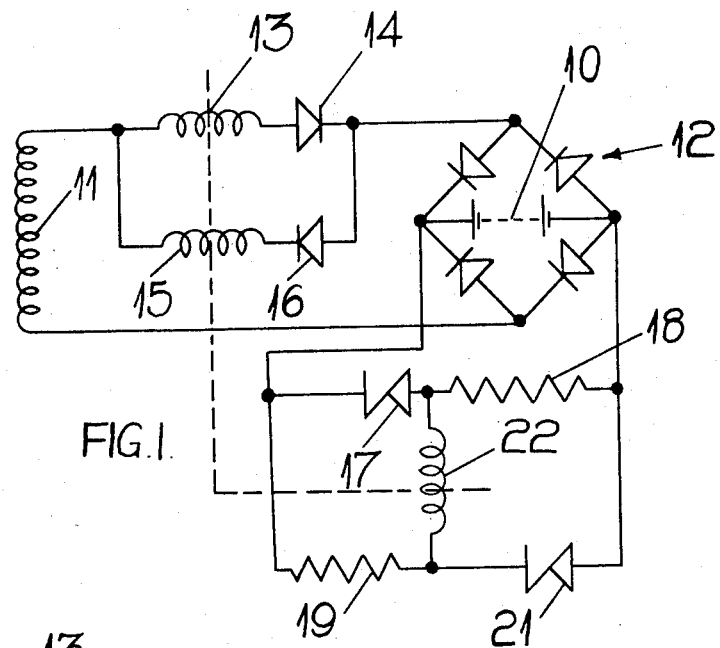

United States Patent
Hill

[11] 3,757,198
[45] Sept. 4, 1973

[54] BATTERY CHARGING SYSTEMS

[75] Inventor: William Frank Hill, Stafford, England

[73] Assignee: Joseph Lucas (Industries) Limited, Birmingham, England

[22] Filed: Aug. 13, 1971

[21] Appl. No.: 171,774

Related U.S. Application Data

[63] Continuation of Ser. No. 879,826, Nov. 25, 1969, abandoned.

[52] U.S. Cl.................... 322/28, 321/25, 322/91, 322/95, 323/89 R
[51] Int. Cl.................... H02p 9/00, G05f 1/04
[58] Field of Search ............... 322/28, 95, 96, 91; 323/82, 83, 89 R; 321/25; 320/61, 71

[56] References Cited
UNITED STATES PATENTS
| | | | |
|---|---|---|---|
| 3,633,090 | 1/1972 | Hill | 322/91 X |
| 2,733,402 | 1/1956 | Bixby | 321/25 X |
| 3,452,268 | 6/1969 | Grossoehme | 323/89 R |

OTHER PUBLICATIONS
Power Supply Handbook, Birman, pp. 58–58, 1965 Library No. TK 451, K4B5

Primary Examiner—J. D. Miller
Assistant Examiner—H. Huberfeld
Attorney—Holman, Glascock, Downing & Seebold

[57] ABSTRACT

In a system in which a permanent magnet alternator charges a battery through a full wave rectifier, regulation of the output voltage is effected by providing a variable impedance controlling the supply of power from the alternator to the rectifier. This impedance includes a first saturable inductor and a first diode connected in series for passing current of one polarity, and an identical second inductor and a second diode connected in series with one another, the second inductor and second diode together directly across the series connection of first inductor and first diode for passing current of the other polarity. A voltage sensing and controlling means is connected across the battery and controls the impedances of the inductors, by means of a control winding which is associated with said inductors.

1 Claim, 2 Drawing Figures

BATTERY CHARGING SYSTEMS

This application is a continuation of application Ser. No. 879,826 filed Nov. 25, 1969, now abandoned.

This invention relates to battery charging systems, particularly for road vehicles, of the kind including a permanent magnet alternator supplying power to a battery through a full wave rectifier, and has for its object to provide such a system incorporating convenient means for regulating the battery voltage.

A system according to the invention comprises, in combination, a permanent magnet alternator supplying power to the battery through a full wave rectifier; a variable impedance controlling the supply of power from the alternator to the rectifier; said impedance including a first circuit comprising a first saturable inductor and a first diode connected in series for passing current of one polarity, and a second circuit in parallel with said first circuit and comprising an identical second inductor and a second diode connected in series directly across for passing current of the other polarity; and a voltage sensing and controlling means connected across the battery, to control the impedances of said first and second inductors to regulate the battery voltage said means including a control winding which is so associated with the inductor as to provide a controlled saturating effect and a desaturating bias effect thereto.

Figure 2:
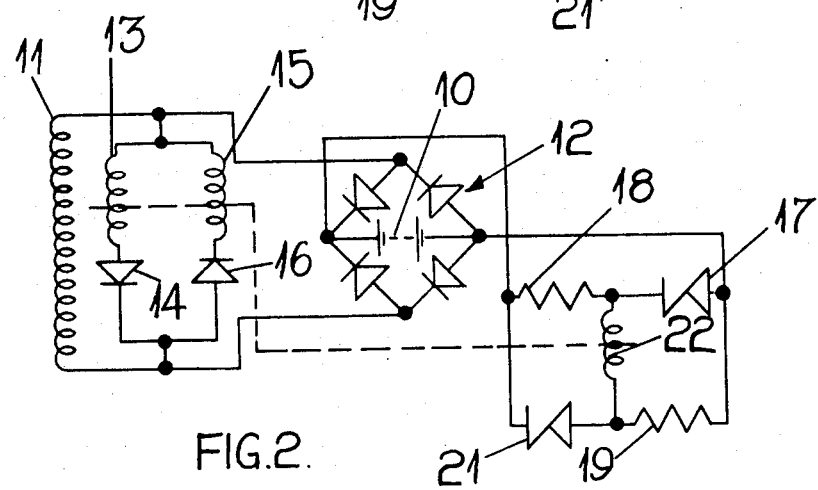

In the accompanying drawings, FIGS. 1 and 2 are circuit diagrams illustrating two example of the invention.

Referring to FIG. 1, a single phase permanent magnet alternator 11 has one end of its winding connected to one input terminal of a full wave rectifier 12, the other end of the winding 11 being connected to the other input terminal of the rectifier 12 through a saturable inductor 13 in series with a diode 14, the inductor 13 and diode 14 being bridged by a second saturable inductor 15 and a second diode 16 which is connected the opposite way of the diode 14. The battery 10 of a vehicle is connected across the output terminals of the rectifier 12, which are also bridged by parallel paths one of which contains a Zener diode 17 and a resistor 18, and the other of which contains a resistor 19 and Zener diode 21. The junctions of the Zener diode 17 and resistor 18, and the resistor 19 and Zener diode 21 are interconnected by a control winding 22 which is associated with the inductors 13, 15 in such a way as to affect their saturation; the control winding can affect the saturation of cores of said inductors by providing a d.c. bias effect thereto.

The arrangement is such that when the output voltage of the battery 10 is below a predetermined value, neither of the Zener diodes 17 and 21 conducts, and current can flow from the output terminals of the bridge through the resistor 19, the winding 22 and the resistor 18. The inductors 13 and 15 conduct respectively, the positive and negative half-cycles of the supply and are of the self saturating type, that is to say they have high remanence magnetic cores which are saturated by the pulses from the supply, so that the inductors present a low impedance. Current flowing through the winding 22 in this direction assists the self-saturating action of the inductors 13 and 15. When the predetermined voltage is reached, both Zener diodes 17 and 21 conduct, so that the current through the winding 22 first falls to zero and then reverses and reaches a value at which it overcomes the self-saturating action of the inductor, and causes the inductors to present a high impedance to current flow from the winding 11 to the rectifier 12. The pulse of alternator voltage at the commencement of each half-cycle will tend to saturate the appropriate inductor 13 or 15, and the current which passes during any half-cycle will depend on the direction and magnitude of the current in the winding 22. The arrangement is such that the voltage across the battery is maintained substantially constant.

In the modification shown in FIG. 2, the winding 11 is connected directly to the input terminals of the full wave rectifier 12, and the saturable inductors and their diodes are connected across the winding 11. The arrangement of the Zener diodes 17 and 21 is such that the winding 22 causes the inductors 13 and 15 to have a high impedance when the voltage of the battery is below the predetermined value, rather than above the predetermined value as in the first example. When the battery voltage is above the predetermined value, the inductors 13, 15 are saturated, aided by the current flow through the winding 23, and the alternator output is short-circuited through the low impedance of the inductor 13 and 15.

I claim

1. A voltage regulated rectifying system comprising, in combination, an alternating current generator supplying power to a direct current load through a full wave rectifier, a variable impedance controlling the supply of power from the generator to the rectifier, said impedance including a first circuit connected across the generator output comprising a first saturable inductor and a first diode connected in series for passing current of one polarity, and a second circuit directly in parallel with said first circuit and comprising an identical second saturable inductor and a second diode connected in series for passing current of the other polarity, and a voltage sensing means connected across said load to control the impedances of said first and second inductors to regulate the voltage supplied to the load, said voltage sensing means including a control winding so associated with said saturable inductors as to provide a controlled saturating effect and a desaturating bias effect thereto, said voltage sensing means also including Zener diode circuit means for selectively connecting said control winding to said load so that current flows through the control winding in one direction when the voltage across the load is below a predetermined limit so as to increase the impedance of each of said saturable inductors and such that current flows through the control winding in an opposite direction when the voltage across the load is in excess of said predetermined limit so as to assist in saturating each of said saturable inductors and so decreasing the impedance thereof.

* * * * *

UNITED STATES PATENT OFFICE
CERTIFICATE OF CORRECTION

Patent No. 3,757,198     Dated September 4, 1973

Inventor(s) William Frank Hill

It is certified that error appears in the above-identified patent and that said Letters Patent are hereby corrected as shown below:

The term of this patent subsequent to

January 4, 1989, has been disclaimed.

Signed and Sealed this

Twenty-seventh Day of July 1976

[SEAL]

Attest:

RUTH C. MASON            C. MARSHALL DANN
*Attesting Officer*           *Commissioner of Patents and Trademarks*